US008979000B2

(12) United States Patent
Matsuura

(10) Patent No.: US 8,979,000 B2
(45) Date of Patent: Mar. 17, 2015

(54) ULTRASONIC ATOMIZATION METHOD AND APPARATUS

(75) Inventor: Kazuo Matsuura, Naruto (JP)

(73) Assignee: Honke Matsuura Brewery Co., Ltd., Tokushima (JP)

( * ) Notice: Subject to any disclaimer, the term of this patent is extended or adjusted under 35 U.S.C. 154(b) by 158 days.

(21) Appl. No.: 12/972,844

(22) Filed: Dec. 20, 2010

(65) Prior Publication Data

US 2011/0147482 A1 Jun. 23, 2011

(30) Foreign Application Priority Data

Dec. 22, 2009 (JP) ................................ 2009-291440

(51) Int. Cl.

*B05B 1/08* (2006.01)
*B05B 17/06* (2006.01)
*B01D 1/14* (2006.01)
*B01D 1/20* (2006.01)

(52) U.S. Cl.

CPC .............. *B05B 17/0615* (2013.01); *B01D 1/14* (2013.01); *B01D 1/20* (2013.01)
USPC .................. 239/102.2; 239/4; 239/8; 239/11; 239/355; 239/368; 239/124; 239/127

(58) Field of Classification Search

CPC ......... B05B 17/0615; B01D 1/14; B01D 1/20
USPC ........... 96/389; 239/4, 8, 11, 102.1, 355, 368, 239/124, 127, 102.2; 261/30, 81, 128
See application file for complete search history.

(56) References Cited

U.S. PATENT DOCUMENTS

| | | | | |
|---|---|---|---|---|
| 3,469,785 | A * | 9/1969 | Tobin et al. | 239/4 |
| 4,738,806 | A | 4/1988 | Noma et al. | |
| 5,217,165 | A * | 6/1993 | Takahashi et al. | 239/102.2 |
| 5,485,828 | A * | 1/1996 | Hauser | 128/200.16 |
| 7,357,334 | B2 * | 4/2008 | Matsuura et al. | 239/34 |
| 7,686,285 | B2 * | 3/2010 | Murray et al. | 261/81 |
| 2005/0016380 | A1 * | 1/2005 | Matsuura et al. | 96/389 |
| 2006/0213508 | A1 * | 9/2006 | Murray et al. | 128/200.16 |
| 2008/0000842 | A1 | 1/2008 | Matsuura et al. | |

FOREIGN PATENT DOCUMENTS

| | | |
|---|---|---|
| JP | 6-507836 | 9/1994 |
| JP | 2005-66554 | 3/2005 |
| WO | 98/36888 | 8/1998 |

OTHER PUBLICATIONS

Extended European Search Report issued Mar. 8, 2013 in European Patent Application No. 10196377.5.

* cited by examiner

*Primary Examiner* — Jason Boeckmann
*Assistant Examiner* — Joel Zhou
(74) *Attorney, Agent, or Firm* — Wenderoth, Lind & Ponack, LLP

(57) ABSTRACT

In the ultrasonic atomization method, a liquid is ultrasonically oscillated in an atomization chamber 4 and a liquid column P is projected in carrier gas to thus atomize the liquid into mists, the carrier gas carrying the atomized mists outwardly of the atomization chamber 4; the carrier gas is forcibly sucked from a lateral point being away at a distance (d1) of 5 cm or less from a center axis m of the liquid column P and thereby a gas flow is blown across the liquid column P; the mists are separated away from the liquid column P by means of the blown gas flow; and such separated mists are transferred outwardly of the atomization chamber 4 by means of the carrier gas.

16 Claims, 10 Drawing Sheets

ULTRASONIC ATOMIZATION METHOD AND APPARATUS

BACKGROUND OF THE INVENTION

1. Technical Field

The present invention relates to a method and apparatus for atomizing a liquid into fine mists. The invention relates in particular to an ultrasonic atomization method and apparatus that is used as an apparatus for atomizing Sake, alcohol used for Sake production, petroleum, crude oil or the like into the mists to obtain a highly concentrated solution as a target substance, or which is optimally used as a humidifier, etc. for atomizing water into the mists to be vaporized into the air.

2. Background Art

The present inventor has previously developed an apparatus for atomizing a liquid containing alcohol into mists, collecting such atomized mists, and separating highly concentrated alcohol (see Patent Document 1). This separation apparatus can, for example, ultrasonically oscillate a starting liquid containing alcohol, atomize the liquid into fine mists to be sent into carrier gas, separate and collect the atomized mists, and separate an alcohol liquid having a higher concentration than the starting liquid. The separation apparatus of this system can separate a highly concentrated alcohol with a small amount of energy when compared with an apparatus in which a starting liquid is heated and vaporized.

In addition, a humidifier ultrasonically oscillating and atomizing water into the mists and vaporizing the atomized mists can humidify the air with a large amount of water and with a small amount of power consumption when compared with a method of heating and vaporizing the water.

In the case of the apparatus for atomizing a liquid into the mists, it is vital how efficiently the liquid can be ultrasonically oscillated and atomized into the mists. This is because the efficiency of atomizing into the mists determines the amount of energy to be consumed, and when the efficiency decreases, the energy consumption increases accordingly. For example, when a lowly concentrated alcohol having been obtained from fermented organic substances is to be separated from water in producing a highly concentrated alcohol, the atomization of water into the mists can be utilized. This is because the lowly concentrated alcohol is atomized into the mists and the atomized mists are collected to obtain a highly concentrated alcohol. The lowly concentrated alcohol is produced by fermentation of organic waste. According to this method, a huge amount of waste can be efficiently utilized to produce a lowly concentrated alcohol. Conventionally, however, the lowly concentrated alcohol is distilled for concentration into the highly concentrated alcohol, which leads to a great amount of energy consumption. Thus, for production of a highly concentrated alcohol, a large amount of energy is consumed in order to utilize the lowly concentrated alcohol being available at a lower cost, which results in an increased cost due to a large amount of energy consumption. It is really important to seek a lower cost process for converting the lowly concentrated alcohol to the highly concentrated alcohol. The method of atomizing the lowly concentrated alcohol into the mists can save energy consumption because the alcohol is not vaporized unlike in the method of distillation. In the process of atomization into the mists, however, it is important to efficiently atomize the lowly concentrated alcohol into the mists.

The apparatus is also used as a humidifier for ultrasonically oscillating water into the mists. For this humidifier as well, it is important to increase the efficiency of atomizing into the mists by the ultrasonic oscillation in order to achieve efficient humidification with smaller electrical consumption.

When the liquid is ultrasonically oscillated upwardly from the bottom by the oscillation apparatus, a liquid column P is generated on the liquid surface W, as shown in FIG. 1, where the liquid is atomized. The inventor has developed an apparatus and method for atomizing a liquid into mists in accordance with such ultrasonic atomization method (refer to Patent Document 1).

PRIOR ART

Patent Document 1: JP 2005-66554 A

SUMMARY OF THE INVENTION

The apparatus shown in FIG. 2 is designed to ultrasonically oscillate and atomize a liquid into mists. In this apparatus, a liquid column P generated in projecting upwardly of the liquid surface W by means of the ultrasonic oscillation is blasted by a laterally blown wind, by which wind the liquid column P is bent down in a parallel direction with respect to the liquid surface W and thus the atomization efficiency is improved. By bending down the liquid column in a parallel direction with respect to the liquid surface, the apparatus can efficiently atomize the liquid inside the liquid column because attenuation of the vertical ultrasonic oscillation caused by collision is effectively prevented. However, if an even higher atomization efficiency is available than this particular atomization apparatus, it will be possible to further reduce running and equipment costs to minimum. In particular, the apparatus shown in FIG. 2 suffers a disadvantage that it is difficult to increase an atomization efficiency by using multiple ultrasonic oscillators in order to increase an amount of atomization per unit time.

The present invention has been made to further improve the efficiency of atomization, and the object of the invention is to provide an ultrasonic atomization method and apparatus providing such a highly efficient ultrasonic atomization method and apparatus as may exceed a conventional method and apparatus of atomization.

In the ultrasonic atomization method according to a first aspect of the present invention, a liquid is ultrasonically oscillated in an atomization chamber 4 and a liquid column P is projected in carrier gas to thus atomize the liquid into mists, the carrier gas carrying the atomized mists outwardly of the atomization chamber 4; the carrier gas is forcibly sucked from a lateral point being away at a distance (d1) of 5 cm or less from a center axis m of the liquid column P and thereby a gas flow is blown across the liquid column P; the mists are separated away from the liquid column P by means of the blown gas flow; and such separated mists are transferred outwardly of the atomization chamber 4 by means of the carrier gas.

In the ultrasonic atomization method according to a second aspect of the present invention, the carrier gas is forcibly sucked from an intermediate point across a projecting direction of the liquid column P.

In the ultrasonic atomization method according to a third aspect of the present invention, the carrier gas is blown to the liquid column P from a first point and sucked into a second point, and the gas flow is carried across the direction of the liquid column P, whereby the mists are separated away from the liquid column P.

In the ultrasonic atomization method according to a fourth aspect of the present invention, the carrier gas is blown to the liquid column P from a lateral point being away at a distance (d2) of 10 cm or less from the center axis m of the liquid column P, whereby the gas flow is blown across the liquid column P.

In the ultrasonic atomization method according to a fifth aspect of the present invention, a plurality of liquid columns P are provided by ultrasonically oscillating the liquid in the atomization chamber 4 by means of a plurality of ultrasonic oscillators 2; the carrier gas is sucked from a lateral point being away at a distance (d1)) of 5 cm or less from a center axis m of each of the liquid columns P, whereby a gas flow is blown across each of the liquid columns P; the mists are separated away from each of the liquid columns P by means of such blown gas flow; and such separated mists are discharged outwardly of the atomization chamber 4 by means of the carrier gas.

In the ultrasonic atomization method according to a sixth aspect of the present invention, the carrier gas is blown to each of the liquid columns P from a lateral point being away at a distance (d2) of 10 cm or less from the center axis m of each of the liquid columns P, whereby the gas flow is blown across each of the liquid columns P.

The ultrasonic atomization apparatus according to a seventh aspect of the present invention includes:

an atomization chamber 4 for storing the liquid:

a plurality of ultrasonic oscillators 2 for ultrasonically oscillating the liquid and allowing a plurality of liquid columns P to project from a liquid surface to thus atomize the liquid into mists;

an ultrasonic power source 3 connected to the plurality of ultrasonic oscillators 2 to supply high-frequency power thereto for ultrasonic oscillation; and a blower mechanism 20 for blowing a carrier gas to the atomization chamber 4.

In the ultrasonic atomization apparatus, the blower mechanism 20 includes a suction mechanism 21, the suction mechanism being provided with a suction port 22 at a lateral point being away at a distance (d1) of 5 cm or less from a center axis m of each of the liquid columns P generated by each of the ultrasonic oscillators 2, whereby the carrier gas is sucked into the suction port 22 and blown across each of the liquid columns P; wherein the suction mechanism 21 blows the gas flow against each of the liquid columns P to thus separate the mists from each of the liquid columns P and discharge such separated mists outwardly of the atomization chamber 4.

In the ultrasonic atomization apparatus according to an eighth aspect of the present invention, the blower mechanism 20 includes:

a suction mechanism 21 provided with the suction port 22 at a lateral point away from the liquid column P generated by each of the ultrasonic oscillators 2, whereby the carrier gas is sucked into the suction port 22; and a blast mechanism 25 provided with a blower port 26 for blowing the carrier gas against each of the liquid columns P.

The blast mechanism 25 blows the carrier gas against the liquid column P, and the suction mechanism 21 sucks the carrier gas out of the lateral point away from the liquid column P to allow the carrier gas to flow across the liquid column P.

In the ultrasonic atomization apparatus according to a ninth aspect of the present invention, the blast mechanism 25 is provided with the suction port 22 at a lateral point being away at a distance (d2) of 10 cm or less from the center axis m of each of the liquid columns P.

In the ultrasonic atomization apparatus according to a tenth aspect of the present invention, the suction port 22 and blower port 26 are positioned respectively at opposing lateral points away from the liquid column P.

In the ultrasonic atomization apparatus according to an eleventh aspect of the present invention, a distance (D) between the suction port 22 and blower port 26 is 15 cm or less.

In the ultrasonic atomization apparatus according to a twelfth aspect of the present invention, the suction mechanism 21 includes a suction duct 24 provided with the suction port 22 at a lateral point away from each of the liquid columns P, while the blast mechanism 25 includes a blower duct 28 provided with the blower port 26 at a lateral point away from each of the liquid columns P; the suction duct 24 and blower duct 28 are positioned alternately in a plurality of lines, and each ultrasonic oscillator 2 is positioned between the suction duct 24 and blower duct 28 which are adjacent to each other; and the carrier gas is blown from the blower port 26 of the blower duct 28 against each of the liquid columns P generated by each ultrasonic oscillator 2, and the carrier gas is sucked into the suction port 22 of the suction duct 24.

The ultrasonic atomization method and apparatus respectively according to first and seventh aspects of the invention can yield such an excellent efficiency of atomization as may exceed a conventional method and apparatus of atomization. For example, in terms of the same ultrasonic oscillator and the same air volume, a speed of atomization per hour in the ultrasonic atomization apparatus as shown in FIG. 3 exhibits a superb improvement of being more than seven times the speed achieved by the apparatus shown in FIG. 2. This is because in the atomization method and apparatus of the present invention the carrier gas is sucked from the lateral point being away at a distance (d1)) of 5 cm or less from the center axis of the liquid column and is blown to the liquid column, and thus the carrier gas flows across the liquid column to efficiently separate from the liquid column the mists which are atomized around the periphery of the liquid column.

In the ultrasonic atomization method according to a second aspect of the invention, the carrier gas is blown across the intermediate point of the liquid column, and the mists can be efficiently separated from the liquid column. This is because the carrier gas blown across the liquid column can separate the mists from the liquid column at its full height.

In the ultrasonic atomization method according to a third aspect of the invention, the carrier gas is blown from a first lateral point of the liquid column and sucked into a second lateral point of the liquid column, which assures that the carrier gas can be most efficiently used for separating the mists. This enables the mists to be efficiently separated with a particularly smaller air volume.

In the ultrasonic atomization method according to a fifth aspect of the invention, a plurality of ultrasonic oscillators efficiently separate the mists from each of the liquid columns generated by each of ultrasonic oscillators. Thus, the use of a plurality of ultrasonic oscillators enables a total amount of atomizable mists to be highly increased.

In the ultrasonic atomization apparatus according to an eighth aspect of the invention, the carrier gas is blown out of the blower port in the blast mechanism to the lateral point away from the liquid column, and sucked from the lateral point away from the liquid column into the suction port in the suction mechanism in a manner that the carrier gas is carried across the liquid column. The carrier gas blown from a first lateral point of the liquid column and sucked into a second lateral point can be most efficiently used for separation of the mists. Thus, the mists can be efficiently separated with a smaller air volume in the blower mechanism.

In the ultrasonic atomization apparatus according to a tenth aspect of the invention, the arrangement of the suction port and blower port respectively at the opposing lateral points away from the liquid column enables the carrier gas fed out of the blower port to be carried across the liquid column for an efficient suction into the suction port.

In the ultrasonic atomization apparatus according to an eleventh aspect of the invention, the arrangement of the liquid column between the suction port and the blower port, being set at the distance (D) of 15 cm or less, enables the carrier gas to be forcibly blown rectilinearly from the blower port to the suction port, with the dispersion of the carrier gas being reduced to minimum. In addition, the passage of such blown carrier gas through the liquid column enables the mists to be separated in a specially efficient manner.

In the ultrasonic atomization apparatus according to a twelfth aspect of the invention, while its entire structure is simplified, the mists can be efficiently separated from the plurality of liquid columns.

MODE(S) FOR CARRYING OUT THE INVENTION

Figure 1:
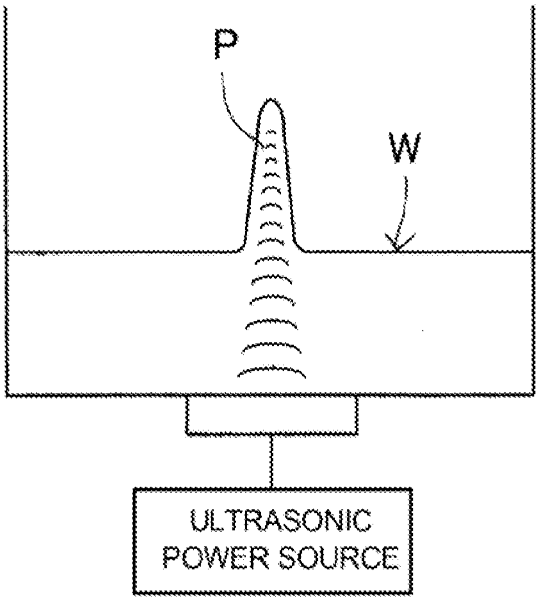
FIG. 1 is a schematic, cross section view showing the state where the solution is ultrasonically oscillated to form a liquid column on the surface of the solution.
Figure 2:
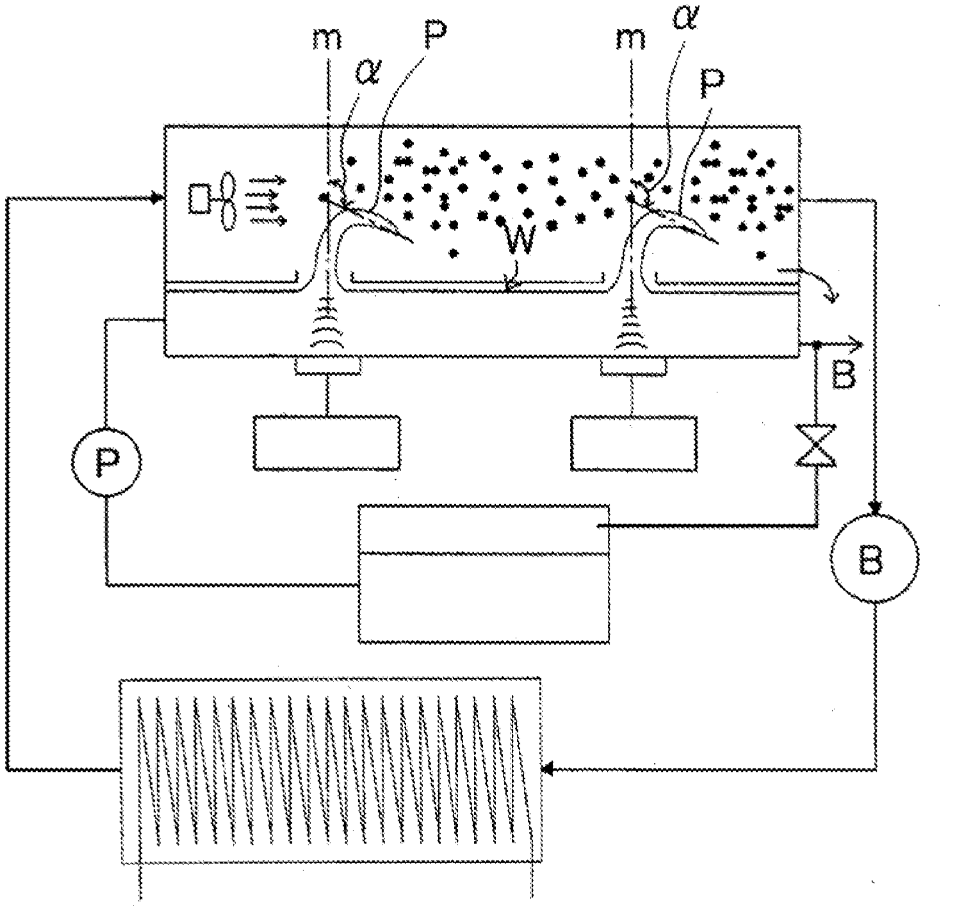
FIG. 2 is a block diagram which schematically shows the ultrasonic separation apparatus having previously been invented by the present inventor.

Embodiments of the present invention will now be discussed in conjunction with the accompanying drawings. It should be noted here that the following embodiments are intended to be illustrative of an ultrasonic atomization method and apparatus to embody the technical ideas of the invention, and the inventive method and apparatus are, in no way, limited to the ultrasonic atomization method and apparatus described below.

Further, in the present disclosure, reference numerals corresponding to members shown in the embodiments are suffixed to members shown in the "CLAIMS" and "MEANS TO SOLVE THE PROBLEM" in order to facilitate appreciation of the claims. However, the members shown in the claims shall, in no way, be specified to those members shown in the embodiments.

In the present ultrasonic atomization method and apparatus, the liquid is ultrasonically oscillated to atomize the mists into the carrier gas. A specific example in which the ultrasonic atomization apparatus is used as a separation apparatus shall now be discussed in conjunction with embodiment(s) of the present invention. In the separation apparatus described below, a liquid containing two or more substances is ultrasonically oscillated to be atomized into mists, and such atomized mists are condensed and collected to thus separate the liquid. In the present invention, however, an application of the ultrasonic atomization apparatus is not limited to a liquid separation apparatus. The ultrasonic atomization apparatus of the present invention can also be used as a humidifier for atomizing water into mists to be vaporized into the air.

In the following separation apparatus provided with the ultrasonic atomization apparatus, a specific liquid is separated in a high concentration from a liquid containing at least two kinds of substances. Although not intended to specify a solvent and/or a solute contained in the liquid, water is a main solvent. Besides the water, other organic solvents such as alcohol can also be used. By way of example, the liquid to be separated includes any of the following:

(1) refined Sake, beer, wine, table vinegar, sweet Sake for cooking, spirits, Japanese 'Shouchuu' spirits, brandy, whisky, liquor;

(2) any liquid including a perfume, aromatic component or aroma component such as pinene, linalool, limonene, polyphenol;

(3) any liquid including an organic compound belonging to any among the alkanes or cyclo-alkanes, which are saturated hydrocarbons, alkenes, cyclo-alkenes, alkynes, which are unsaturated hydrocarbons, or ethers, thioethers or aromatic hydrocarbons, or a substance in which these are combined;

(4) any liquid including a substance in which, in an organic compound belonging to any among the alkanes or cyclo-alkanes, which are saturated hydrocarbons, alkenes, cyclo-alkenes, alkynes, which are unsaturated hydrocarbons, or ethers, thioethers or aromatic hydrocarbons, or a combination of these, at least one hydrogen atom or functional radical has been replaced with a halogen;

(5) any liquid including a substance in which, in an organic compound belonging to any among the alkanes or cyclo-alkanes, which are saturated hydrocarbons, alkenes, cyclo-alkenes, alkynes, which are unsaturated hydrocarbons, or ethers, thioethers or aromatic hydrocarbons, or a combination of these, at least one hydrogen atom or functional radical has been replaced with a hydroxyl group;

(6) any liquid including a substance in which, in an organic compound belonging to any among the alkanes or cyclo-alkanes, which are saturated hydrocarbons, alkenes, cyclo-alkenes, alkynes, which are unsaturated hydrocarbons, or ethers, thioethers or aromatic hydrocarbons, or a combination of these, at least one hydrogen atom or functional radical has been replaced with an amino group;

(7) any liquid including a substance in which, in an organic compound belonging to any among the alkanes or cyclo-alkanes, which are saturated hydrocarbons, alkenes, cyclo-alkenes, alkynes, which are unsaturated hydrocarbons, or ethers, thioethers or aromatic hydrocarbons, or a combination of these, at least one hydrogen atom or functional radical has been replaced with a carbonyl group;

(8) any liquid including a substance in which, in an organic compound belonging to any among the alkanes or cyclo-alkanes, which are saturated hydrocarbons, alkenes, cyclo-alkenes, alkynes, which are unsaturated hydrocarbons, or ethers, thioethers or aromatic hydrocarbons, or a combination of these, at least one hydrogen atom or functional radical has been replaced with a carboxyl group;

(9) any liquid including a substance in which, in an organic compound belonging to any among the alkanes or cyclo-alkanes, which are saturated hydrocarbons, alkenes, cyclo-alkenes, alkynes, which are unsaturated hydrocarbons, or ethers, thioethers or aromatic hydrocarbons, or a combination of these, at least one hydrogen atom or functional radical has been replaced with a nitro group;

(10) any liquid including a substance in which, in an organic compound belonging to any among the alkanes or cyclo-alkanes, which are saturated hydrocarbons, alkenes, cyclo-alkenes, alkynes, which are unsaturated hydrocarbons, or ethers, thioethers or aromatic hydrocarbons, or a combination of these, at least one hydrogen atom or functional radical has been replaced with a cyano group;

(11) any liquid; including a substance in which, in an organic compound belonging to any among the alkanes or cyclo-alkanes, which are saturated hydrocarbons, alkenes, cyclo-alkenes, alkynes, which are unsaturated hydrocarbons, or ethers, thioethers or aromatic hydrocarbons, or a combination of these, at least one hydrogen atom or functional radical has been replaced with a mercapto group;

(12) any liquid including a substance in which any one or more atoms included in a liquid mentioned above in (3) to (11) has been replaced with a metal ion;

(13) any liquid including a substance in which any hydrogen atom, carbon atom or functional radical in a molecule included in a liquid mentioned above in (3) to (11) has been replaced with any molecule among molecules mentioned above in (3) to (11);

(14) any liquid including a substance in which any carbon atom in a molecule included in a liquid mentioned above in (3) to (11) has been replaced with any atom;

(15) any liquid including nonvolatile matter such as surfactant, saline, saccharide, organic acid, inorganic acid, and amino acid; and

(16) any liquid mixture with water including heavy water.

When a liquid containing two or more substances is ultrasonically oscillated to separate mists from the liquid and such separated mists are condensed and collected, a concentration of contained substance(s) differs between the liquid collected from the mists and the remaining liquid which is not turned to the mists. For example, when an alcoholic solution is atomized into mists by the ultrasonic oscillation and such atomized mists are collected, the liquid thus collected from the atomized mists has a higher concentration of alcohol than does the remaining alcohol which is not turned to the mists. The reason for such higher alcohol concentration in the liquid obtained by condensing and collecting the mists is that when compared with the water, the alcohol is easier to be atomized into fine mists by the ultrasonic oscillation.

Now with alcohol being taken as an exemplary liquid, an explanation shall be made on a separation apparatus for atomizing the alcohol into mists by the ultrasonic atomization apparatus, collecting the mists, and separating highly concentrated alcohol from the collected mists. It should be noted that, in the separation apparatus, the liquid is not specified to be alcohol as a target to be atomized and separated. The invention can be used for separating any of the liquids that can be separated in the form of atomized mists as enumerated above, as well as for separating other kinds of liquids.

Figure 3:
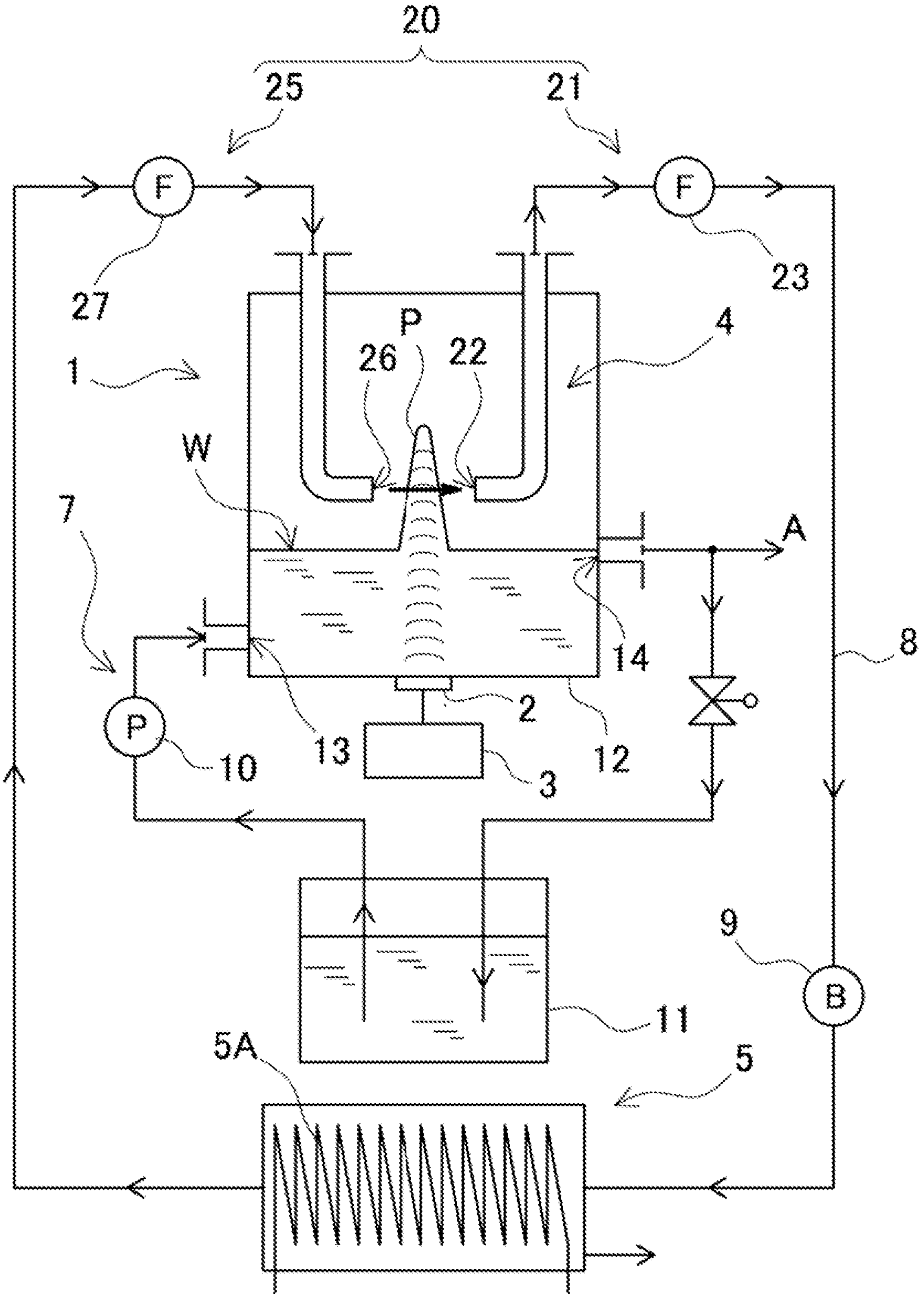
FIG. 3 is a block diagram which schematically shows the separation apparatus provided with the ultrasonic atomization apparatus in accordance with an embodiment of the present invention.

The liquid separation apparatus shown in FIG. 3 includes an ultrasonic atomization apparatus 1 for atomizing the liquid into the mists, and a collection unit 5 for collecting the mists atomized by the ultrasonic atomization apparatus 1.

Figure 4:
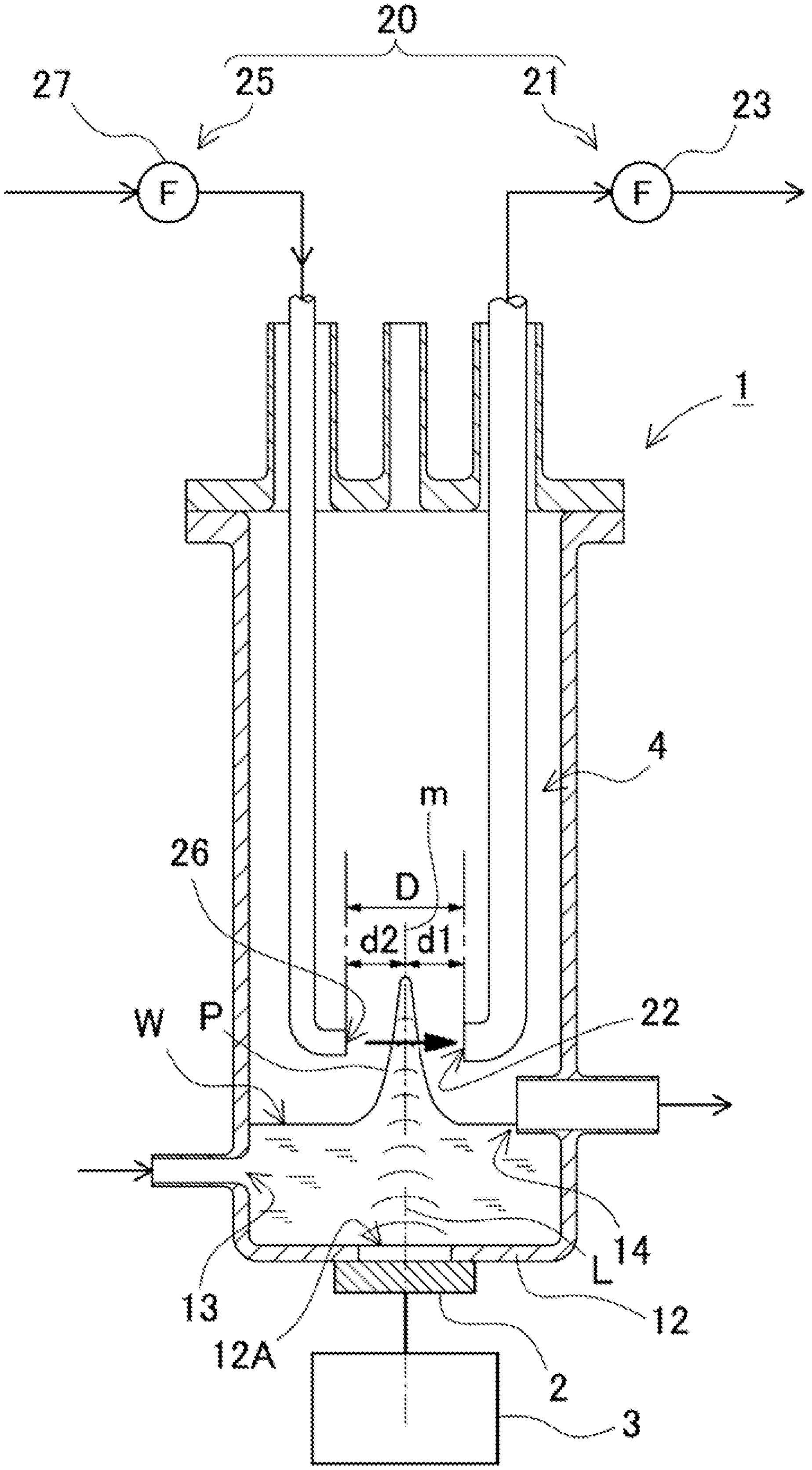
FIG. 4 is a vertical, cross sectional view showing the ultrasonic atomization apparatus in accordance with an embodiment of the invention.

The ultrasonic atomization apparatus shown respectively in FIG. 3 and FIG. 4 includes an atomization chamber 4 for storing a liquid to be atomized into mists, an ultrasonic oscillator 2 for ultrasonically oscillating the liquid and allowing a liquid column P to project from the liquid surface W to thus atomize the liquid into the mists, an ultrasonic power source 3 connected to the ultrasonic oscillator 2 and supplying high-frequency power to the ultrasonic oscillator 2 for ultrasonic oscillation, and a blower mechanism 20 for blowing the carrier gas into the atomization chamber 4.

The atomization chamber 4 is a closed chamber storing a liquid maintained at a given level of liquid surface W, inside which the liquid is atomized into the mists and such atomized mists are discharged outwardly by means of the carrier gas. It should be noted, however, that the atomization chamber does not necessarily have to be completely sealed off but can be partially opened. The atomization chamber 4 shown in FIG. 4 is provided with a liquid supply port 13 positioned below the liquid surface level. In order to control a constant level of the liquid to be supplied, the chamber is provided with an overflow port 14. The liquid is supplied from the supply port 13 and discharged through the overflow port 14. In this atomization chamber 4, the liquid surface is controlled the overflow port 14 to maintain a constant level, but it is also possible to maintain the constant level of the liquid surface by controlling a weight of the liquid supplied from the supply port 13. In the atomization chamber 4 where the constant level of the liquid surface is controlled, the depth of the liquid to be ultrasonically oscillated by the ultrasonic oscillator 2 can be maintained to be such a depth as may be most efficiently atomizable.

The liquid is supplied into the atomization chamber 4 using a supply mechanism 7. The supply mechanism 7 shown in FIG. 3 includes a liquid reservoir 11 storing the liquid to be supplied to the atomization chamber 4, and a liquid pump 10 for supplying into the atomization chamber 4 the liquid stored in the liquid reservoir 11. The liquid pump 10 has its suction side connected to the liquid reservoir 11 while having its discharging side communicated with the atomization chamber 4. This supply mechanism 7 is so constructed as to continuously supply the liquid from the liquid reservoir 11 to the atomization chamber 4. In the ultrasonic atomization apparatus 1 shown in FIG. 3, while the liquid is discharged out of the atomization chamber 4, the liquid is supplied from the liquid reservoir 11 to thus prevent a reduction of the concentration of a target substance, such as liquid alcohol, in the atomization chamber 4. In this ultrasonic atomization apparatus 1, when a concentration of the target substance is reduced, i.e., when a given time period is elapsed, the liquid can be renewed by replacing a new liquid in the atomization chamber 4 and the liquid reservoir 11. Also as indicated by arrow A in the drawing, it is possible to prevent a reduction of the concentration of the target substance contained in the liquid reservoir 11, by discharging the liquid contained in the atomization chamber 4 outwardly instead of circulation into the liquid reservoir 11.

Figure 5:
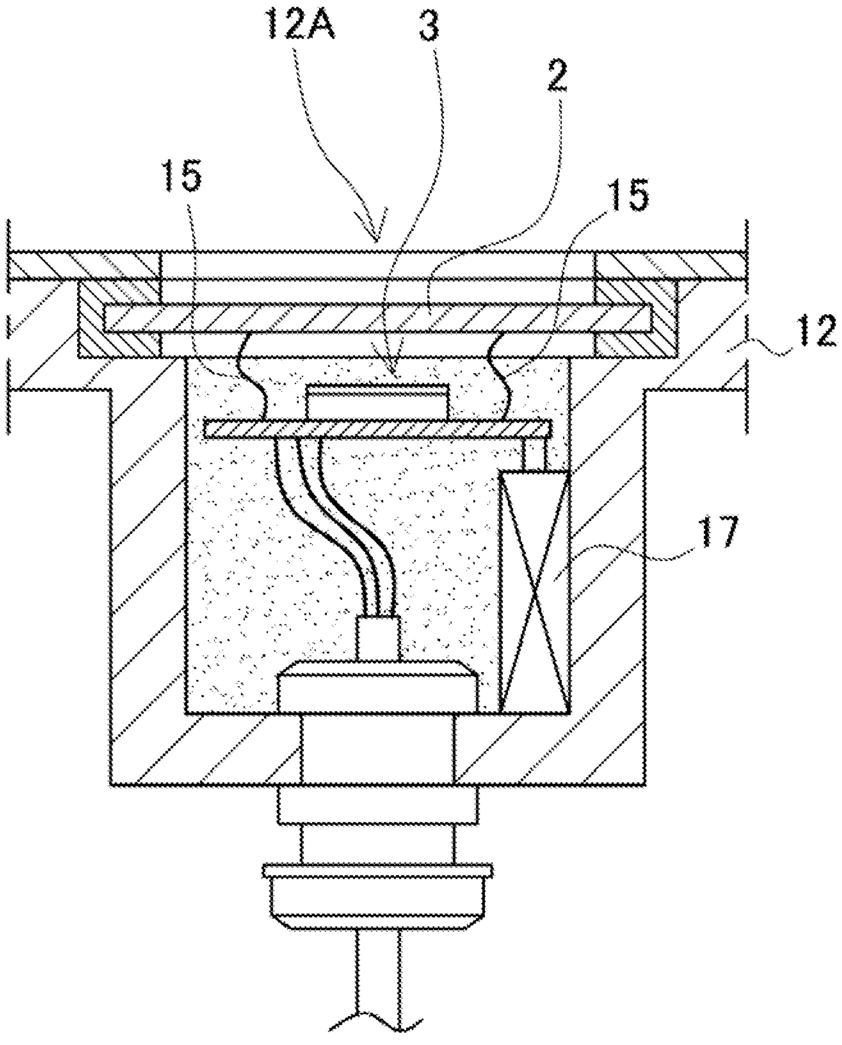
FIG. 5 is an enlarged, cross sectional view showing the connection structure of the ultrasonic oscillator.

As shown in the enlarged, cross sectional view in FIG. 5, the ultrasonic oscillator 2 is so fixed as to water-tightly close off the opening 12A provided to the bottom plate 12 of the atomization chamber 4. With an electrode provided on a back surface being connected to the high-frequency power source 3, the ultrasonic oscillator 2 is ultrasonically oscillated by the power supplied from the high-frequency power source 3. The high-frequency power source 3 is connected to the ultrasonic oscillator 2 via a lead wire 15 to thus output high-frequency power to the ultrasonic oscillator 2.

Figure 6:
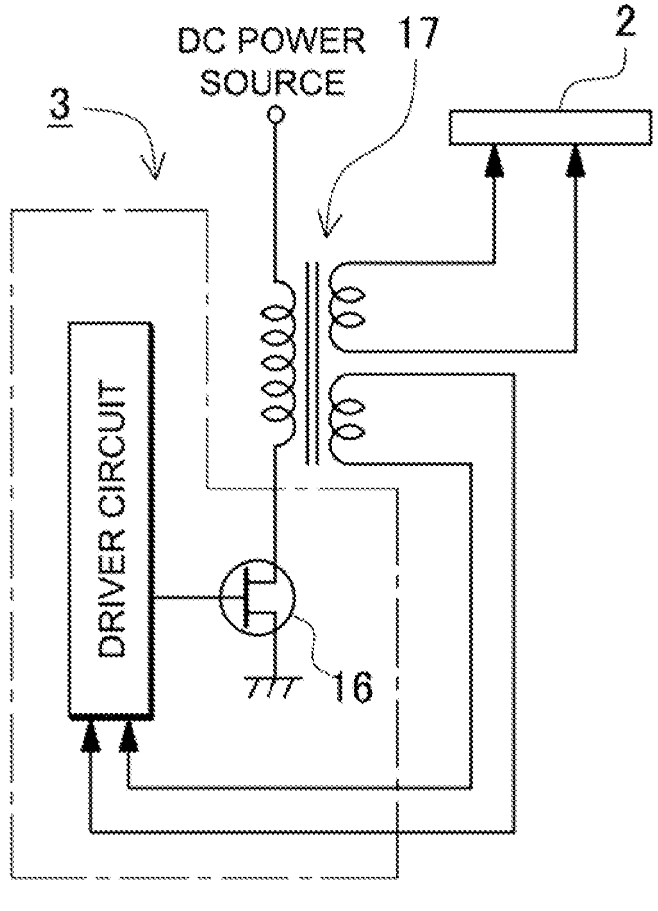
FIG. 6 is a circuit diagram showing an example of the amplifier for high frequency.

As shown in FIG. 6, the high-frequency power source 3 is provided with an output transistor 16 which is switched on and off at given intervals to output the high-frequency power to the ultrasonic oscillator 2. The output side of the output transistor 16 is connected via a transformer 17 to the ultrasonic oscillator 2. The illustrated high-frequency power source 3 employs an FET as the output transistor 16 but can also employ a bipolar transistor.

As shown in FIG. 4, the blower mechanism 20 is provided with the suction port 22 being away at a distance (d1) of 5 cm or less from the center axis m of the liquid column P generated by ultrasonic oscillation, and includes a suction mechanism 21 for sucking the carrier gas into the suction port 22 to blow the gas flow across the liquid column P. As the carrier gas is blown across the liquid column P, the liquid column P is so formed that its distal end bends in the blowing direction as shown in FIG. 4, depending on an air volume to be blown. The bending form is not uniform but varies depending on the air volume of the carrier gas. In the present specification, therefore, the "center axis m of the liquid column" shall mean the direction that when the carrier gas is not blown, the liquid column P is projected by the ultrasonic oscillator 2, namely, the vertical line L running in the center of the ultrasonic oscillator 2. The suction port 22 is at a distance (d1) away from the center axis m which coincides with the vertical line L.

Furthermore, the blower mechanism 20 shown in FIG. 4 is also provided with a blast mechanism 25 for blowing the carrier gas toward the liquid column P. The blast mechanism 25 laterally blows the carrier gas toward the liquid column P from the blower port 26 provided at the lateral point away from the liquid column P. In the illustrated blower mechanism 20, the blower port 26 is arranged at a first lateral point away from the liquid column P, and the suction port 22 is arranged at a second lateral point away from the liquid column P. In other words, the blower port 26 and the suction port 22 are placed at opposing lateral points away from the liquid column P, between which is placed the liquid column P.

In the blower mechanism 20 described above, the carrier gas is blown rectilinearly from the blower port 26 toward the suction port 22, which is made possible by sucking into the suction port 22 the carrier gas blown from the blower port 26. Such rectilinearly blown carrier gas flows across the liquid column P to efficiently separate from the liquid column P the mists generated around the liquid column P. The blower port 26 and the suction port 22 are provided at the intermediate point of the projecting direction of the liquid column P. When the projecting length of the liquid column P is considered to be 100%, the suction port 22 and the blower port 26 which are opened at the intermediate point of the projecting direction of the liquid column P are placed for example at the position of 10%-80% in the projecting direction, preferably 30%-80%, and more preferably 40%-80%. The blower port 26 and the suction port 22 provided at the intermediate point of the liquid column P allows the carrier gas to flow across the intermediate point of the liquid column P, and thus the mists dispersed around the liquid column P is most efficiently separated from the liquid column P.

The suction port 22; being at a distance (d1) of 5 cm or less away from the center axis m of the liquid column P, allows the sucked carrier gas to be efficiently carried across the liquid column P. When the distance (d1)) of the suction port 22 away from the center axis m of the liquid column P is shortened, the carrier gas sucked into the suction port 22 can be blown across the liquid column P more efficiently. Therefore, the distance (d1) of the suction port 22 away from the center axis m of the liquid column P is set to be more preferably 3 cm or less. However, when the suction port 22 is placed too close to the liquid column P, larger particles of the mists generated around the liquid column P are more likely to be sucked into the suction port 22, resulting in a difficulty of selectively sucking fine mists alone. When larger mists are sucked, a separation efficiency decreases in the case of the separation apparatus. For example, in the case of an apparatus for atomizing an alcoholic solution into the mists, an alcoholic concentration with fine mists becomes higher than the one with larger mists. Therefore, in the case of an atomization apparatus to be used as a separation apparatus, the distance (d1) of the suction port 22 away from the center axis m of the liquid column P is set to be an optimal value, with the size of the sucked mists being taken into consideration, and so such distance (d1) is set to be for example larger than 3 mm, and preferably larger than 5 mm. However, in the case of such an atomization apparatus as may not mind the size of mists like in a humidifier, the distance of the suction port away from the center axis of the liquid column can be shortened to allow the mists to be generated more efficiently.

Furthermore, when the blower port 26 is also placed closer to the liquid column P, the carrier gas can be efficiently blown across the liquid column P. Therefore, the distance (d2) of the blower port 26 away from the center axis m of the liquid column P is set to be 10 cm or less, and preferably 5 cm or less. When the blower port 26 is also placed too close to the liquid column P, the mean particle size of the mists separated from the liquid column P becomes larger. Therefore, in the case of an atomization apparatus to be used as a separation apparatus, the distance (d2) of the blower port 26 away from the center axis m of the liquid column P is set to be preferably 3 mm or more, and more preferably 5 mm or more.

In the case of a blower mechanism 20 having the blower port 26 and the suction port 22 respectively placed at opposite lateral points away from the liquid column P, in other words, in the case of a blower mechanism 20 having the liquid column P placed between the blower port 26 and the suction port 22, the distance (D) between the blower port 26 and the suction port 22 affects an atomization efficiency and a mean particle size of the mists. As the blower port 26 and the suction port 22 are placed closer to each other, the carrier gas blown rectilinearly from the blower port 26 to the suction port 22 becomes larger in volume, and the carrier gas blown dispersedly away from the straight line becomes smaller in volume. For this reason, the atomization efficiency can be increased when the distance (D) between the blower port 26 and the suction port 22 is shortened to enable the carrier gas to be efficiently blown across the liquid column P. However, when such distance (D) is too short, the mean particle size of the mists separated from the liquid column P becomes larger. Therefore, in the case of an atomization apparatus to be used as a separation apparatus, the distance (D) between the blower port 26 and the suction port 22 is set to be, for example, 15 cm or less, and preferably 8 cm or less, and thus the mean particle size of the separated mists becomes smaller. However, in an application that the mean particle size of the mists is not minded like in a humidifier, the distance (D) between the blower port 26 and the suction port 2 can be made narrower.

Figure 7:
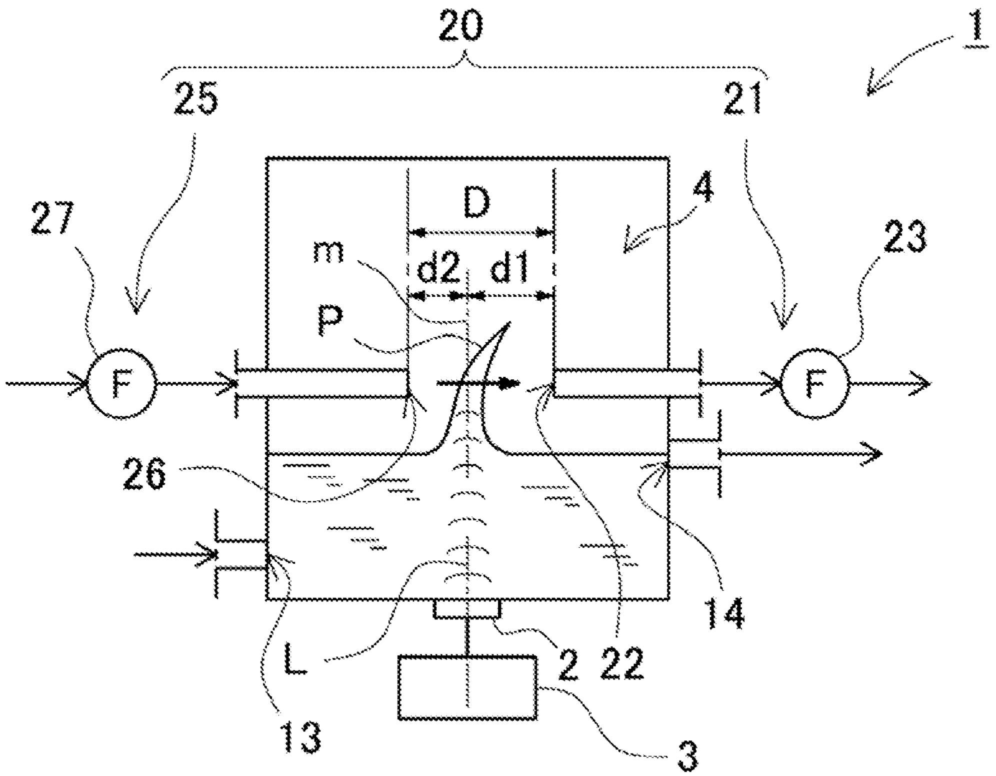
FIG. 7 is a vertical, cross sectional view showing the ultrasonic atomization apparatus in accordance with another embodiment of the invention.

In the blower mechanism 20 shown in FIG. 7, the distance (d2) of the blower port 26 of the blast mechanism 25 away from the center axis m of the liquid column P is made shorter than the distance (d1) of the suction port 22 of the suction mechanism 21 away from the center axis m of the liquid column P. This blower mechanism 20 carries the advantage that the mists can be efficiently separated from the liquid column P which is bent by the carrier gas blown from the blower port 26 and thus the mean particle size can be made smaller. This is because even when the liquid column P is bent by the carrier gas blown across the liquid column P, the suction port 22 is positioned away from the liquid column P to thus suck the mists.

In the blower mechanism 20 shown respectively in FIG. 4 and FIG. 7, the suction mechanism 21 is provided with a suction fan 23 for sucking the carrier gas into the suction port 22. The suction fan 23 sucks the carrier gas out of the atomization chamber 4 into the suction port 22, and the carrier gas is forcibly discharged outwardly. When the carrier gas is forcibly discharged, the atomization chamber 4 is evacuated. When the atomization chamber 4 is evacuated, the carrier gas is blown out of the blower port 26 into the atomization chamber 4. The atomization apparatus in which the atomization chamber 4 is evacuated and the carrier gas is discharged outwardly can improve the atomization efficiency by evacuating the atomization chamber 4. In addition, the carrier gas can be blown out of the blower port 26 toward the liquid column P without using a fan for forcibly blowing the carrier gas out of the blower port 26. In the blower mechanism 20, however, the blower port 26 can also be connected to the blower fan 27 to blow the carrier gas to the liquid column P by means of the blower fan 27. It is also possible that the blower port 26 is connected to the blower fan 27 and the suction port 22 is connected to the suction fan 23, and thus the carrier gas can also be blown across the liquid column P by both of the blower fan 27 and the suction fan 23.

In the blower mechanism 20 shown respectively in FIG. 4 and FIG. 7, the blast mechanism 25 has the blower port 26 connected to the blower fan 27, and the blower fan 27 blows the carrier gas to the liquid column P. In this blower mechanism 20, the carrier gas is blown to the liquid column P without evacuating the atomization chamber 4. Furthermore, in the illustrated blower mechanism 20, the blower port 26 is connected to the blower fan 27 while the suction port 22 is connected to the suction fan 23, and thus the carrier gas is blown across the liquid column P by both of the blower fan 27 and the suction fan 23. In the blower mechanism 20 provided with the blower fan 27 and the suction fan 23, the suction of the suction fan 23 is powered up to be stronger than the blower fan 27 to thus be able to blow the carrier gas to the liquid column P, with the atomization chamber 4 being evacuated. It is also possible that the blow of the blower fan 27 is powered up to be stronger than the suction 23 to thus be able to keep the atomization chamber under a pressurized state.

Figure 8:
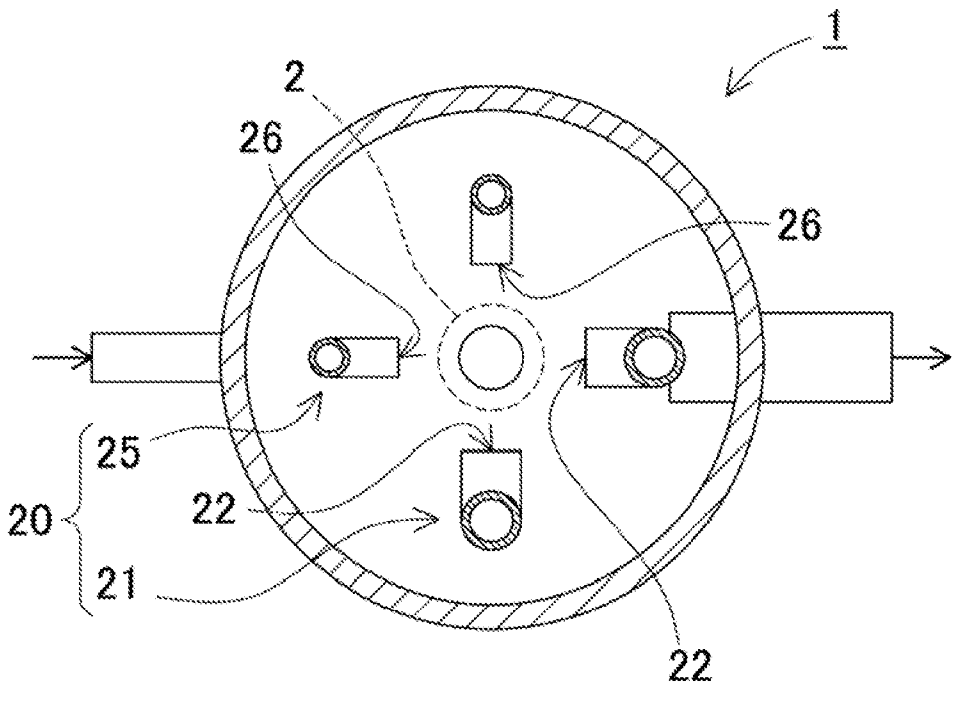
FIG. 8 is a horizontal, cross sectional view showing the ultrasonic atomization apparatus in accordance with yet another embodiment of the invention.

In the blower mechanism 20 shown respectively in FIG. 4 and FIG. 7, the suction port 22 is placed at a first lateral point away from the liquid column P and the blower port 26 is placed at a second lateral point away from the liquid column P, and thus the carrier gas is blown across the liquid column P. In the blower mechanism 20 as shown in FIG. 8, two lateral points away from the liquid column P may be respectively provided with each blower port 26 to make up the suction mechanism 21, and another two lateral points away from the liquid column P may be respectively provided with each suction port 22 to make up a blast mechanism 25. In this blower mechanism 20, the blower port 26 and the suction port 22 are placed at opposite positions, and thus the carrier gas blown out of the blower port 26 is sucked into the suction port 22 to be blown across the liquid column P. In this blower mechanism 20 as well, the distance (d1) of the suction port 22 away from the center axis m of the liquid column P is set to be 5 cm or less, and the distance (d2) of the blower port 26 away from the center axis m of the liquid column P is set to be 10 cm or less.

In the ultrasonic atomization apparatus 1 described above, the ultrasonic oscillator 2 are placed horizontally to allow the liquid column P to project vertically from the liquid surface. Regarding the atomization apparatus, it is also possible that the ultrasonic oscillator 2 is placed in an oblique posture to allow the liquid column P to project in an oblique posture with respect to the liquid surface. In this atomization apparatus as well, "the center axis of the liquid column" shall mean a vertical line at the center of the ultrasonic oscillator.

Figure 9:
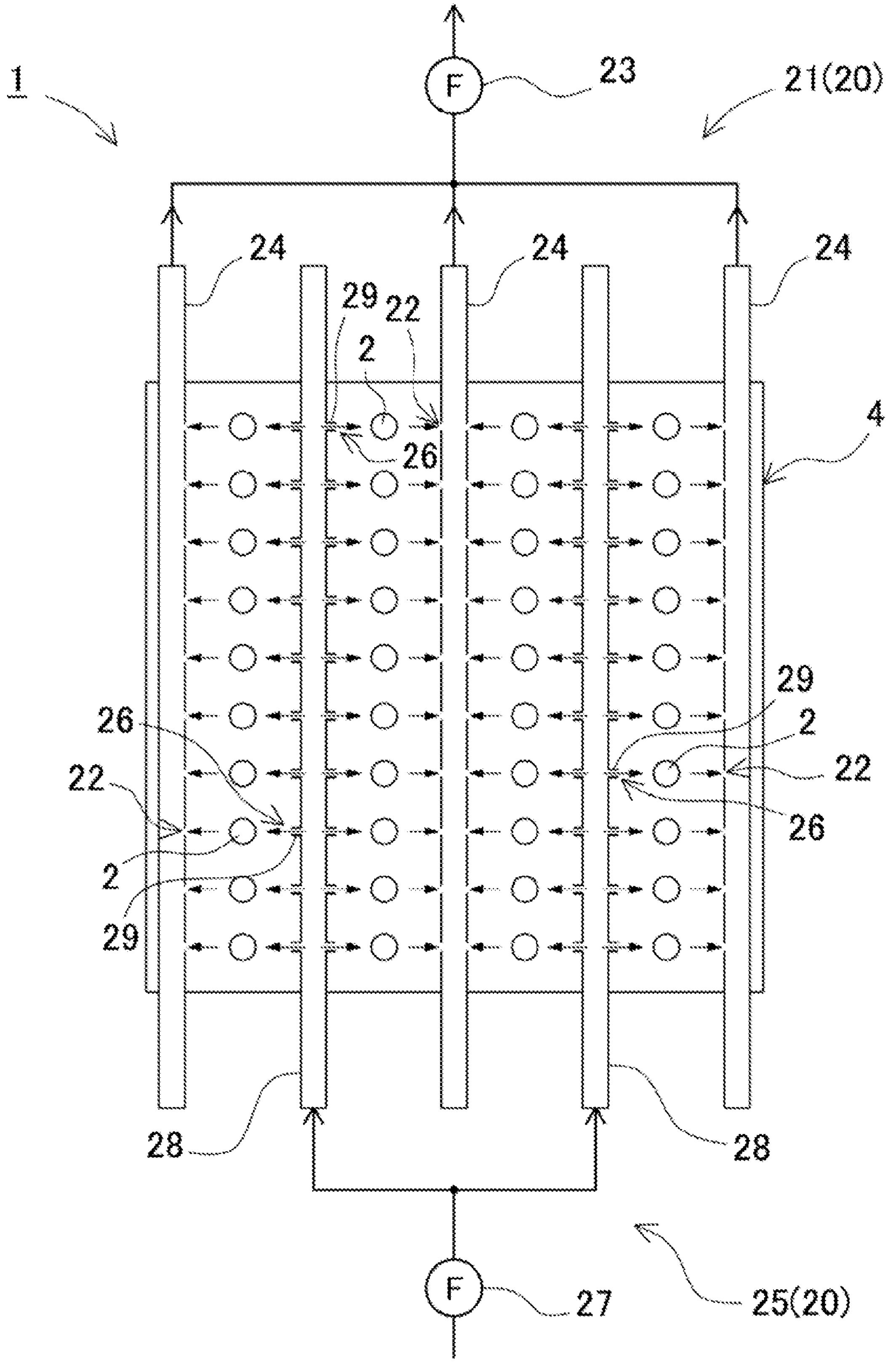
FIG. 9 is a top plan view showing the ultrasonic atomization apparatus in accordance with even another embodiment of the invention.
Figure 10:
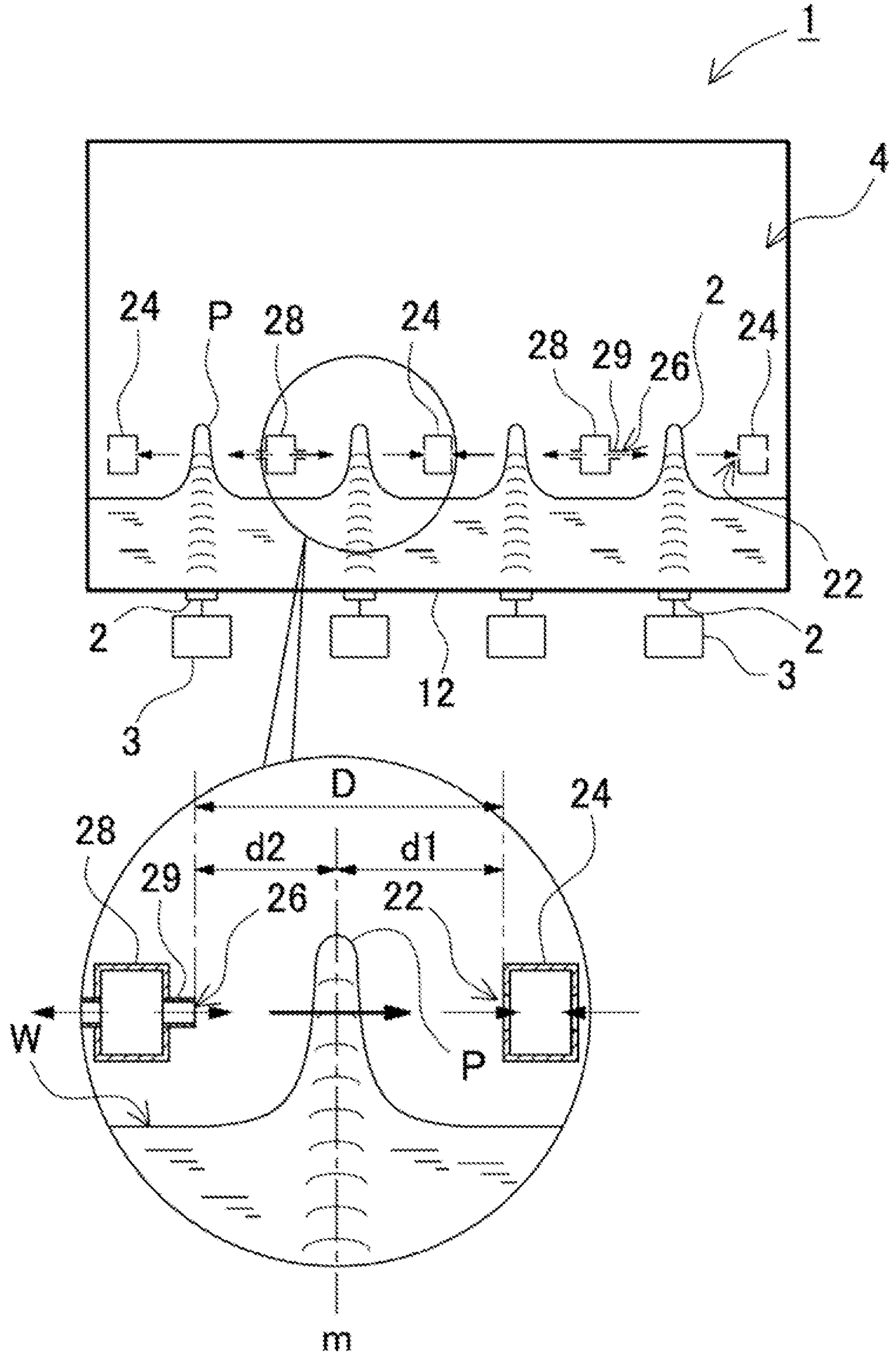
FIG. 10 is a partially enlarged, vertical, cross sectional view of the ultrasonic atomization apparatus shown in FIG. 9.

The ultrasonic atomization apparatus 1 shown in the top plan view in FIG. 9 and in the vertical, cross section view in FIG. 10 has a plurality of arrays of ultrasonic oscillators 2 arranged in the atomization chamber 4. In the illustrated ultrasonic atomization apparatus 1, ten pieces of ultrasonic oscillators 2 are placed in one row, which are then arranged to make up four lines, thus arranging forty pieces of ultrasonic oscillators 2 in total at the bottom of the atomization chamber 4.

In the illustrated ultrasonic atomization apparatus 1, the suction mechanism 21 includes a suction duct 24 in which a suction port 22 is provided at a lateral point away from each liquid column P, while the blast mechanism 25 includes a blower duct 28 in which a blower port 26 is provided at a lateral point away from each liquid column P. In the illustrated atomization apparatus, the suction duct 24 of the suction mechanism 21 and the blower duct 28 of the blast mechanism 25 are arranged in a parallel relationship on opposite sides of each row of ultrasonic oscillator 2. The suction duct 24 is provided with the suction port 22 at a lateral point away from the liquid column P projecting above each ultrasonic oscillator 2. Therefore, the suction duct 24 has the suction port 22 at the interval of arranging each ultrasonic oscillator 2. In the suction mechanism 21, the suction duct 24 is placed such that the distance (d1) of the suction port 22 away from the center axis m of the liquid column P generated by each ultrasonic oscillator 2 is 5 cm or less. The blower duct 28 is provided with the blower port 26 at the lateral point away from the liquid column P. The blower duct 28 shown in FIG. 10 is provided with an injection portion 29 projecting from the blower duct 28 toward the liquid column P, and thus the carrier gas can be effectively blown toward the liquid column P, with a distal end of the injection portion 29 being provided with the blower port 26. The blower duct 28 as well is provided with the blower port 26 at the interval of arranging each ultrasonic oscillator 2. In the blast mechanism 25 as well, the blower duct 28 is arranged such that the distance (d2) of the blower port 26 away from the center axis m of the liquid column P generated by each ultrasonic oscillator 2 is 10 cm or less. The suction duct 24 and the blower duct 28 are alternately arranged in a plurality of rows, and the ultrasonic oscillator 2 is arranged between the suction duct 24 and the blower duct 28 which are adjacent to each other.

Furthermore, in the blower mechanism 20 shown in FIG. 9, the blower duct 28 is connected to the blower fan 27, while the suction duct 24 is connected to the suction fan 23. In the atomization apparatus described above, the carrier gas is blown out of the blower port 26 of the blower duct 28 to each liquid column P generated by each ultrasonic oscillator 2, and the carrier gas is sucked into the suction port 22 of the suction duct 24; thus the carrier gas is blown across the liquid column P and the mists are separated from each liquid column P.

Figure 11:
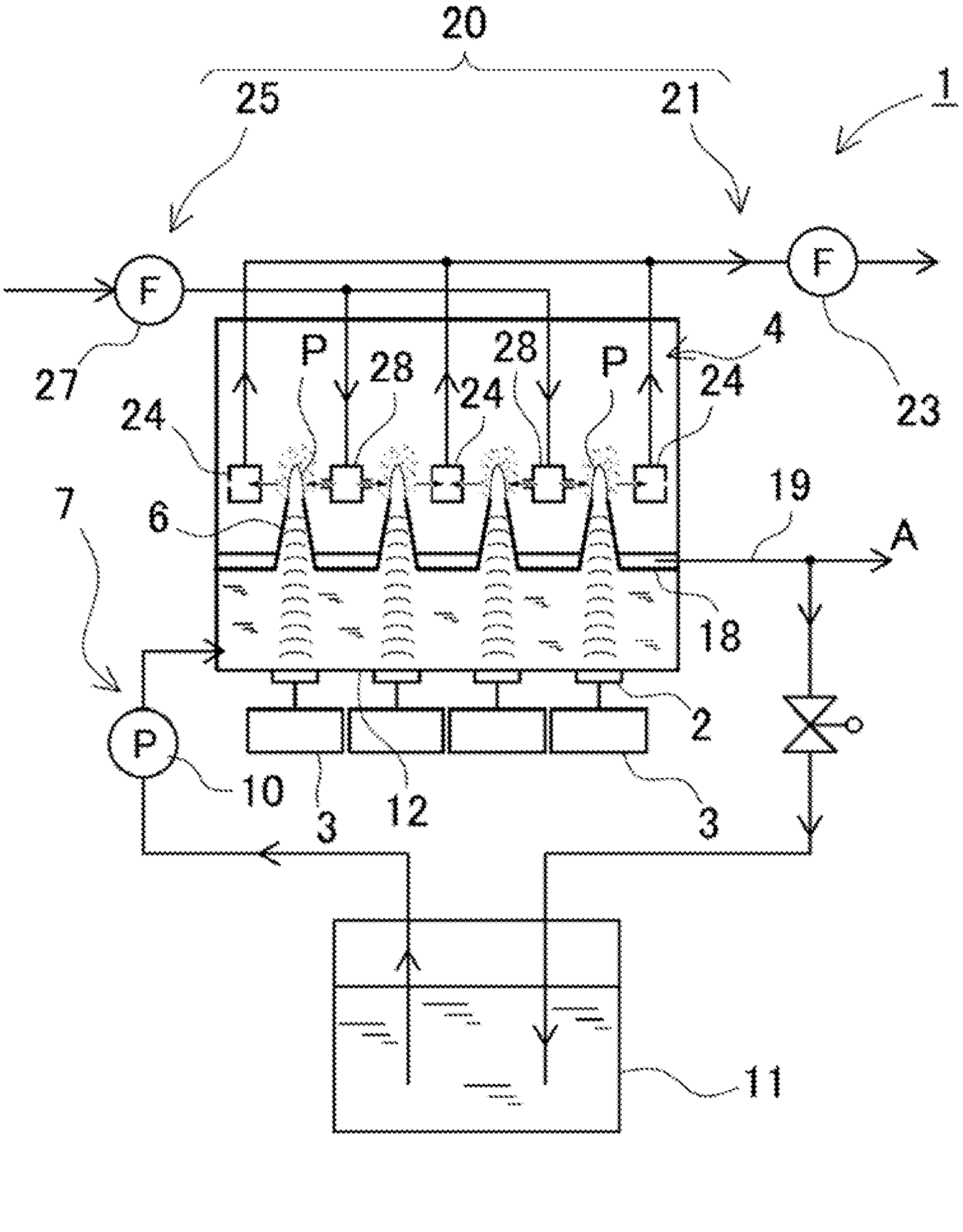
FIG. 11 is a vertical, cross sectional view showing the ultrasonic atomization apparatus in accordance with an alternative embodiment of the invention.
Figure 12:
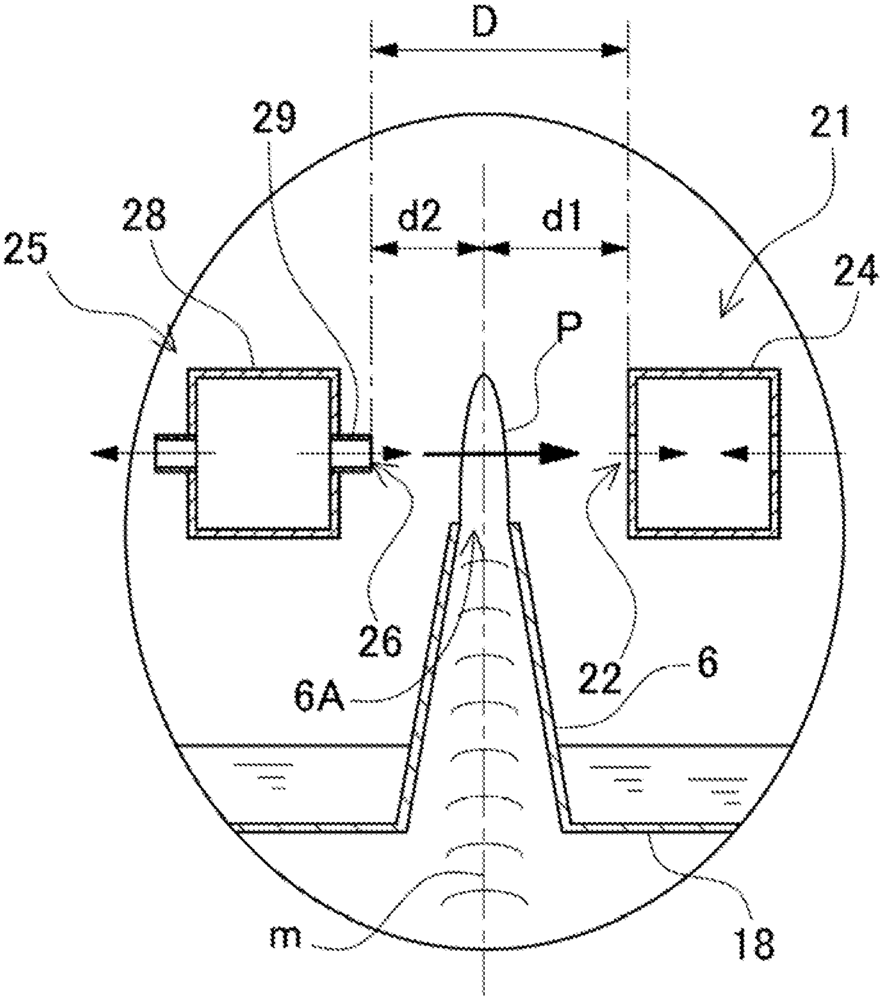
FIG. 12 is an enlarged, cross sectional view of the ultrasonic atomization apparatus shown in FIG. 11.

Furthermore, in the ultrasonic atomization apparatus 1 shown respectively in FIG. 11 and FIG. 12, a tubular body 6 is arranged inside the atomization chamber 4. The tubular body 6, being arranged above the ultrasonic oscillator 2, allows the liquid column P to project out of the top end of tubular body 6, the liquid column P being generated from the liquid which is ultrasonically oscillated by the ultrasonic oscillator 2. The tubular body 6, being a conical tube tapered toward the upper end, is provided with a spraying port 6A at the upper end. In the ultrasonic atomization apparatus 1 illustrated in these drawings, the liquid supplied to the atomization chamber 4 is supplied inside the tubular body 6, while the liquid supplied inside the tubular body is subjected to an ultrasonic oscillation directed from the ultrasonic oscillator 2 toward the spraying port 6A, from which is projected the generated liquid column P. The illustrated ultrasonic oscillator 2 radiates an ultrasonic wave upwardly. Therefore, the tubular body 6 is arranged, above the ultrasonic oscillator 2, in a vertical posture.

In the ultrasonic atomization apparatus 1 shown in FIG. 11, a plurality of ultrasonic oscillators 2 are arranged on the bottom plate 12 of the atomization chamber 4, while a plurality of tubular bodies 6 are placed at the lower portion of the atomization chamber 4 in an opposing relationship with respect to each ultrasonic oscillator 2. In the case of this ultrasonic atomization apparatus 1, the plurality of tubular bodies 6 are arranged to be upwardly spaced apart from the bottom plate 12 to which the ultrasonic oscillator is fixed. In the ultrasonic atomization apparatus 1, the ultrasonic oscillation generated by the ultrasonic oscillator 2 positioned below the lower end of the tubular body 6 is guided inwardly of the tubular body 6, and thus the liquid column P is projected out of the spraying port 6A located at the upper end of the tubular body 6. The plurality of tubular bodies 6, with their lower ends being connected to a connection plate 18, are arranged on the same plane. In this ultrasonic atomization apparatus 1, the lower portion of the atomization chamber 4 to which the liquid is supplied is of a structure being closed by the tubular bodies 6 and the connection plate 18, and the liquid supplied in here is to be projected by the ultrasonic oscillation as a liquid column P into the gas out of the spraying ports 6A of the plurality of tubular bodies 6.

In the ultrasonic atomization apparatus 1 provided with the tubular body 6, the liquid supplied inwardly of the tubular body 6 is exposed to the ultrasonic oscillation in the direction toward the spraying port 6A from the ultrasonic oscillator 2, and thus the liquid column P is projected from the spraying port 6A. This tubular body 6 allows the liquid column to efficiently protect from the liquid being ultrasonically oscillated by the ultrasonic oscillator 2. The illustrated tubular body 6 is a conical horn tapering gradually toward the upper end. However, the tubular body can be an exponential horn with its inner surface being of an exponentially curved shape. The tubular body in the shape of a conical horn or an exponential horn has an advantage that the ultrasonic oscillation can be efficiently transmitted inwardly to efficiently generate the liquid column P. It should be noted, however, that the tubular body can also be a cylindrical, oblong or polygonal tube.

For an efficient transmission of the ultrasonic oscillation inwardly of the tubular body, the inner shape at the lower end of the tubular body 6 is made either smaller or larger than the outer shape of the ultrasonic oscillator 2, and thus the ultrasonic oscillation rises along the inner surface of the tubular body 6. As illustrated in FIG. 11 and FIG. 12, in the tubular body 6 which is arranged to be spaced apart from the bottom plate 12 to which the ultrasonic oscillator 2 is fixed, the inner diameter of the spraying port 6A at the lower end of the tubular body 6 is set to be 50-150%, preferably 60-100% of the outer diameter of the ultrasonic oscillator 2.

The size of the spraying port 6A of the tubular body 6 specifically determines the diametrical thickness of the liquid column P when the liquid supplied into the tubular body 6 projects as the liquid column P out of the spraying port 6A, namely the cross section of the liquid column P. A liquid column with its larger cross section, due to its larger surface area, can be efficiently atomized into the gas by the ultrasonic oscillation. To be noted is that when such cross section is too large, energy required of the ultrasonic oscillator for atomization from the surface of the liquid column becomes larger. Conversely, when the cross section is made smaller, the energy required of the ultrasonic oscillator for atomization can be made smaller, but the surface area of the liquid column becomes smaller and the efficiency of atomizing into the mists decreases in a state where the carrier gas is blown. Therefore, with these factors in mind, the size of the spraying port 6A of the tubular body 6 is designed to be optimal in accordance with the size, output, frequency, etc. of the ultrasonic oscillator 2.

With reference to the liquid column P projecting out of the spraying port 6A of the tubular body 6, the mists are separated by the carrier gas carried by the blower mechanism 20, and such separated mists are transferred by means of the carrier gas outwardly of the atomization chamber 5. The illustrated blower mechanism includes the suction mechanism 21 that is provided with a suction port 22 at a lateral point away from the liquid column P projecting out of the spraying port 6A of the tubular body 6, and which sucks the carrier gas into the suction port 22 to thus blow the gas flow across the liquid column P. In addition, the blower mechanism 20 shown in FIG. 11 also includes the blast mechanism 25 for blowing the carrier gas toward the liquid column P. In the blast mechanism 25, the carrier gas is blown laterally toward the liquid column P out of the blower port 26 opened at a lateral point away from the liquid column P. In the blower mechanism 20 shown in FIG. 12, the blower port 26 is placed at a first lateral point away from the liquid column P, the suction port 22 is placed at a second lateral point away from the liquid column P, namely, the blower port 26 and the suction port 22 are placed at opposite lateral points away from the liquid column P with respect to each other, or in other words, the liquid column P is placed between the blower port 26 and the suction port 22. In this blower mechanism 20 as well, the distance (d1) of the suction port 22 away from the center axis m of the liquid column P is set to be 5 cm or less, and preferably 3 cm or less, and thus the carrier gas to be sucked is efficiently blown across the liquid column P. In addition, the distance (d2) of the blower port 26 away from the center axis m of the liquid column P is set to be 10 cm or less, and preferably 5 cm or less.

Furthermore, the blower mechanism 20 shown in FIG. 11 includes the suction fan 23 with which the suction mechanism 21 sucks the carrier gas into the suction port 22, and the carrier gas sucked out of the atomization chamber 4 into the suction port 22 is forcibly discharged outwardly. Also in the blower mechanism 20, the blast mechanism 25 has the blower port 26 connected to the blower fan 27, and the carrier gas is blown by the blower fan 27 to the liquid column P. In this atomization apparatus, the carrier gas out of the blower port 26 of the blower duct 28 is blown to each liquid column P projecting out of the spraying port 6A of the tubular body 6, with the carrier gas being sucked into the suction port 22 of the suction duct 24 so as to be carried across the liquid column P, and thus the mists are separated from each liquid column P. Such structure enables the mists to be efficiently separated and carried from the surface of the liquid column P projecting out of the spraying port 6A of the tubular body 6. In particular, as the tubular body 6 enables the liquid column P to be generated in a more accurate position, the carrier gas can be precisely blown across the liquid column P to thus separate the mists efficiently from the surface of the liquid column P.

Furthermore, in the atomization apparatus shown in FIG. 11, the atomization chamber 4 is provided with a discharge path 19 which is used for collecting the liquid overflowed and blown around the spraying port 6A of the tubular body 6. The liquid column P projecting out of the spraying port 6A of the tubular body 6 in the state of ultrasonically oscillation is atomized into the mists by the carrier gas and such mists are transferred outwardly, but part of the liquid column P, in the state of liquid without being atomized, falls down around the tubular body 6. The atomization chamber 4 is connected to the discharge path 19 in order to collect such liquid. The liquid collected at the discharge path 19 is again circulated into the liquid reservoir 11, or alternatively the liquid is discharged outwardly as indicated by arrow A in the drawing.

In the ultrasonic atomization apparatus 1 described above, the liquid in the atomization chamber 4 is ultrasonically oscillated by the ultrasonic oscillation 2 to be atomized into the mists. The mists atomized by the atomization apparatus is higher than the liquid in terms of the concentration of the target substance. Therefore, the separation apparatus can efficiently separate a highly concentrated liquid through atomizing the liquid by the atomization apparatus and condensing such mists for collection.

The mists of liquid having been atomized by the ultrasonic atomization apparatus 1 is flowed into a collection unit 5 by means of the carrier gas and collected in a collection unit 5. In the separation apparatus shown in FIG. 3, the collection unit 5 is connected to the ultrasonic atomization apparatus 1 through the duct 8 in order to allow the mists to flow into the collection unit 5. In the illustrated separation apparatus, the carrier gas is transferred into the collection unit 5 by means of a blower 9. In the separation apparatus, it should be noted that the suction fan 23 of the blower mechanism 20 can also be jointly used as a blower for transferring the carrier gas into the collection unit 5.

In these separation apparatuses, the carrier gas containing the mists is transferred from the ultrasonic atomization apparatus 1 into the collection unit 5. Particularly in the illustrated separation apparatus, the discharging side of the collection unit 5 is connected to the atomization chamber 4, and the carrier gas with the mist component being separated is circulated to the atomization chamber 4. In this separation apparatus, the carrier gas can preferably be selected from an inert gas such as nitrogen, helium and argon. In this separation apparatus, the inert gas prevents the liquid from getting deteriorated in the ultrasonic atomization apparatus 1 and/or in the collection unit 5. Thus, a highly concentrated liquid can be obtained in the state of a higher quality. However, air can also be used as the carrier gas. Furthermore, in the separation apparatus, the carrier gas can also be supplied, without circulation, by being discharged at the discharging side of the collection unit and through connection of air supply source to the atomization chamber. The air can be used as such carrier gas.

In the collection unit 5, the fine mists are condensed and collected as a highly concentrated alcohol liquid. Therefore, every structure of being able to condense and collect the fine mists and having already been developed or to be developed in the future can be used for this collection unit 5. The mists, not being the gas in nature, can be condensed and collected without being necessarily cooled down. However, when the mists are cooled down, the collection can be accelerated. For example, as shown in FIG. 3, the collection unit 5 can incorporate a cooling heat-exchanger 5A to cool the mists flowed into the collection unit 5 for a larger dew condensation, to thus collect in the form of liquid.

And, although not illustrated, the collection unit can also be so designed that a vapor of target substance such as alcohol contained in the gas is adsorbed into an adsorbent for collection. In such collection unit, for example, the alcohol adsorbed into the adsorbent can be removed by using a heated recovery gas, and then the recovery gas is cooled to condense and recover the removed alcohol. Such a collection unit can be composed of a rotor with the adsorbent provided in an air gap, and a rotational drive mechanism for rotating the rotor. The rotor is a honeycomb rotor having the air gap through which a carrier gas can pass in the direction of the rotational axis. As the adsorbent, for example, any one of zeolite, activated carbon, lithium oxide and silica gel or a mixture of them can be used. In this collection unit, the rotor is rotated at a predetermined speed by means of the rotational drive mechanism and moved between an adsorbing region in which the vapor is adsorbed and a releasing region in which the adsorbed vapor is released. When the rotor is moved into the adsorbing region, the gas containing the vapor of alcohol that is the target substance is passed through the air gap, and the alcohol contained as a target substance in the gas is adsorbed by the adsorbent. When the rotor is rotated and moved into the releasing region, the adsorbed alcohol as a target substance is released. The released alcohol as a target substance is recovered by cooling the recovery gas. The gas having passed through the adsorbing region of the rotor is moved back to the ultrasonic atomization chamber again.

Further, regarding the collection unit, the closed chamber can be provided with a liquid spraying nozzle for spraying the liquid out of the nozzle, for collection of the mists contained in the carrier gas. In addition, the collecting unit can be provided with a plurality of baffles inside, upon the surface of baffle the mists are impinged and adhered, and thus the liquid flowing down by itself can be collected. The baffle has an uneven or rugged surface to enable the mists to be in contact with the surface and collected more efficiently. Furthermore, the collection unit is provided with a fan for forcibly blowing and agitating the mists. Thus, the mists in the collection unit are agitated and impinged upon each other, and the mists can be collected. Such condensed mists rapidly fall downward and can be collected.

Furthermore, the collection unit can be provided with a mist vibrator for enhancing the probability of the mists being impinged upon each other through the vibration of the mists. The mist vibrator includes an electrical-to-mechanical oscillation converter for vibrating the gas in the collection unit, and an electric vibration source for driving the electrical-to-mechanical oscillation converter, wherein sound with an audible frequency and/or an ultrasonic wave higher than the audible frequency are emitted to vehemently vibrate the mists for mutual impingement in an efficient manner for a rapid collection.

In addition, the ultrasonic separation apparatus can have a nozzle for spraying the liquid, a fan for agitating the mists, and a vibrator for vibrating the mists, in a full set built inside the collection unit, and thus the mists can be condensed with the highest efficiency. Two units of such devices for condensing the mists may also be incorporated to condense the mists efficiently.

INDUSTRIAL APPLICABILITY

The method and apparatus for ultrasonically atomizing the liquid, as embodied in accordance with the present invention, can atomize the liquid into the fine mists very efficiently, assuring that the invention can be used as a separation apparatus for atomizing Sake, alcohol used for Sake production, petroleum, crude oil or the like into the mists to obtain a highly concentrated solution as a target substance, or can be advantageously used as a humidifier, etc. for atomizing water into the mists to be vaporized into the air.

The invention claimed is:

1. An apparatus for ultrasonically atomizing a liquid, the apparatus comprising:

an atomization chamber for storing the liquid;

a first ultrasonic oscillator for ultrasonically oscillating the liquid and generating a first liquid column that projects in a projecting direction from a surface of the liquid to atomize the liquid into mist;

an amplifier for ultrasound connected to the first ultrasonic oscillator to supply high-frequency power thereto for ultrasonic oscillation; and a streaming mechanism for conveying a carrier gas in the atomization chamber, the streaming mechanism including a suction mechanism, wherein the suction mechanism has a first suction port located inside the atomization chamber for sucking the carrier gas into the first suction port, and the suction mechanism is elongated and extends into the atomization chamber inwardly, wherein the first suction port of the suction mechanism is arranged in the atomization chamber at a distance away from a center axis of the first liquid column in a horizontal direction perpendicular to the projecting direction of the first liquid column, and an opening of the first suction port will face a side surface of the first liquid column which extends upwardly from the surface of the liquid, wherein the suction mechanism is arranged to suck the carrier gas from the side surface of the first liquid column, which extends upwardly from the surface of the liquid, in a horizontal direction perpendicular to the projecting direction of the first liquid column such that the carrier gas flows across the first liquid column and the mist from the first liquid column is separated and discharged outwardly of the atomization chamber, wherein the streaming mechanism comprises a blast mechanism provided with a first blower port for blowing the carrier gas against the first liquid column generated, wherein the blast mechanism is elongated and extends into the atomization chamber inwardly, wherein the first suction port and the first blower port are located at substantially the same level away from the first ultrasonic oscillator in the projecting direction of the liquid column, and wherein the first suction port and the first blower port are positioned on opposite sides with respect to the first liquid column in the horizontal direction perpendicular to the projecting direction of the liquid column, facing each other within a projecting region of the liquid column in the projecting direction of the liquid column.

2. The apparatus of claim 1, wherein the first suction port of the suction mechanism is positioned at a distance of 5 cm or less away from the center axis of the first liquid column, and the first blower port of the blast mechanism is positioned at a distance of 10 cm or less from the center axis of the first liquid column.

3. The apparatus of claim 1, wherein a distance between the first suction port and the first blower port is 15 cm or less.

4. An apparatus for ultrasonically atomizing a liquid, the apparatus comprising:

an atomization chamber for storing the liquid;

a first ultrasonic oscillator for ultrasonically oscillating the liquid and generating a first liquid column that projects in a projecting direction from a surface of the liquid to atomize the liquid into mist;

an amplifier for ultrasound connected to the first ultrasonic oscillator to supply high-frequency power thereto for ultrasonic oscillation; and a streaming mechanism for conveying a carrier gas in the atomization chamber, the streaming mechanism including a suction mechanism, wherein the suction mechanism has a first suction port located inside the atomization chamber for sucking the carrier gas into the first suction port, and the suction mechanism is elongated and extends into the atomization chamber inwardly, wherein the first suction port of the suction mechanism is arranged in the atomization chamber at a distance away from a center axis of the first liquid column in a horizontal direction perpendicular to the projecting direction of the first liquid column, and an opening of the first suction port will face a side surface of the first liquid column which extends upwardly from the surface of the liquid, wherein the suction mechanism is arranged to suck the carrier gas from the side surface of the first liquid column, which extends upwardly from the surface of the liquid, in a horizontal direction perpendicular to the projecting direction of the first liquid column such that the carrier gas flows across the first liquid column and the mist from the first liquid column is separated and discharged outwardly of the atomization chamber, wherein the streaming mechanism comprises a blast mechanism provided with a first blower port for blowing the carrier gas against the first liquid column generated, wherein the blast mechanism is elongated and extends into the atomization chamber inwardly, wherein the first suction port and the first blower port are located at the same level away from the first ultrasonic oscillator in the projecting direction of the liquid column, and wherein the first suction port and the first blower port are positioned facing each other on opposite sides of the first ultrasonic oscillator in the horizontal direction perpendicular to the projecting direction of the liquid column.

5. The apparatus of claim 1, a distance between the first suction port and a vertical line running through a center of the first ultrasonic oscillator is smaller than a distance between the first blower port and the vertical line of the first ultrasonic oscillator.

6. The apparatus of claim 1, an opening space of the first suction port is larger than an opening space of the first blower port.

7. The apparatus of claim 1, wherein the first suction port and the first blower port are placed at a position of 10% to 80% in a vertical direction with respect to a projecting length of the liquid column when the projecting length of the liquid column is considered to be 100%.

8. The apparatus of claim 4, further comprising a tubular body disposed in the atomization chamber in an opposing relationship with respect to the first ultrasonic oscillator.

9. The apparatus of claim 1, further comprising a second ultrasonic oscillator for ultrasonically oscillating the liquid and generating a second liquid column that projects from the surface of the liquid to atomize the liquid into mist, wherein the suction mechanism includes a first suction duct having the first suction port and a second suction duct having a second suction port, the second suction port being located inside the atomization chamber for sucking the carrier gas into the second suction port, wherein the blast mechanism includes a first blower duct having the first blower port and a second blower duct having a second blower port for blowing the carrier gas against the second liquid column, and wherein the first ultrasonic oscillator is disposed between the first blower duct and the first suction duct, and the second ultrasonic oscillator is disposed between the second blower duct and the second suction duct.

10. The apparatus of claim 9, wherein the first blower duct, the first suction duct, the second blower duct, and the second suction duct surround the ultrasonic oscillators in a horizontal cross section of the atomization chamber.

11. The apparatus of claim 9, wherein the first blower duct, the first suction duct, the second blower duct, and the second suction duct extend in a horizontal direction of the atomization chamber perpendicular to the center axis of the first liquid column and a center axis of the second liquid column, and wherein first blower duct includes a plurality of blower ports, the first suction duct includes a plurality of suction ports, the second blower duct includes a plurality of blower ports, and the second suction duct includes a plurality of suction ports.

12. The apparatus of claim 1, wherein the liquid contains at least two kinds of substances, wherein the apparatus is configured to atomize and separate the liquid to collect and condense the separated mist which contains at least one substance of the at least two kinds of substances, and wherein a liquid collected from the mist and a remaining liquid which is not turned to the mist are different in a concentration of the at least one substance.

13. The apparatus of claim 4, wherein the atomization chamber comprises a liquid supply port for supplying a liquid into the chamber and an overflow port that controls a surface of the liquid to maintain a constant level.

14. The apparatus of claim 4, wherein the first suction port of the suction mechanism is positioned at a distance of 5 cm or less away from the center axis of the first liquid column, and the first blower port of the blast mechanism is positioned at a distance of 10 cm or less from the center axis of the first liquid column.

15. The apparatus of claim 4, wherein a distance between the first suction port and the first blower port is 15 cm or less.

16. The apparatus of claim 4, wherein the first suction port and the first blower port are placed at a position of 10% to 80% in a vertical direction with respect to a projecting length of the liquid column when the projecting length of the liquid column is considered to be 100%.

* * * * *